Patented Oct. 26, 1937

2,097,264

UNITED STATES PATENT OFFICE 2,097,264

METHYL ALPHA - BETA - DICHLOROISO-BUTYRATE AND PROCESS OF PREPARATION OF SAME

Harold James Tattersall, Ardrossan, Scotland, assignor to Imperial Chemical Industries Limited, a corporation of Great Britain No Drawing. Application April 2, 1935, Serial No. 14,277. In Great Britain April 6, 1934

3 Claims. (Cl. 260—106)

This invention relates to methyl alpha-beta-dichloroisobutyrate, a new compound, and to a process of preparing same.

Methyl alpha-beta-dichloroisobutyrate may be prepared by passing chlorine into monomeric methyl methacrylate in the presence of a chlorinating catalyst until no more chlorine is absorbed, the temperature being prevented from rising much above room temperature during the reaction, and the product thus obtained, purified.

In order to illustrate a simple method of preparing methyl alpha-beta-dichloroisobutyrate, the following example is given:

Example.—0.5% of bromine is dissolved in liquid monomeric methyl methacrylate contained in a reaction vessel surrounded by a freezing mixture and chlorine is passed into the methyl methacrylate which is kept at a temperature of 30° C. by the freezing mixture. The introduction of chlorine is terminated when the reaction is finished, as indicated by the ceasing of the evolution of heat. The crude methyl alpha-beta-dichloroisobutyrate thus prepared is washed with a solution of sodium carbonate containing sodium sulfite until neutral to litmus and the product then separated from the washing solution and dried. The methyl alpha-beta-dichloroisobutyrate thus obtained is a liquid which boils at ordinary pressure over the range 180–240° C. with decomposition at the higher limit.

This compound is useful as a plasticizer for polymerized methyl methacrylate. It is also particularly adapted for plasticizing compositions comprising both cellulose nitrate and polymerized methyl methacrylate.

As many apparently widely different embodiments of this invention may be made without departing from the spirit and scope thereof, it is to be understood that the invention is not limited to the specific embodiments thereof except as defined in the appended claims.

I claim:

1. Methyl alpha-beta-dichloroisobutyrate.
2. Process of preparing methyl alpha-beta-dichloroisobutyrate which comprises passing chlorine into liquid monomeric methyl methacrylate at a temperature not substantially above room temperature in the presence of a catalyst until absorption of chlorine ceases.
3. Process of preparing methyl alpha-beta-dichloroisobutyrate which comprises passing chlorine into liquid monomeric methyl methacrylate at a temperature not substantially above room temperature in the presence of catalytic amounts of bromine until absorption of chlorine ceases.

HAROLD JAMES TATTERSALL.